United States Patent [19]
Norro

[11] 3,792,998
[45] Feb. 19, 1974

[54] METHOD FOR PREVENTING THE DILUTION OF SULPHUR DIOXIDE CONTAINING WASTE GASES OBTAINED IN COPPER CONCENTRATE ELECTRIC SMELTING FURNACES

[75] Inventor: Allen Ferdinand Norro, Skelleftehamn, Sweden

[73] Assignee: Boliden Aktiebolag, Stockholm, Sweden

[22] Filed: Feb. 24, 1972

[21] Appl. No.: 229,108

[30] Foreign Application Priority Data
Mar. 1, 1971 Sweden .............................. 2573/71

[52] U.S. Cl. ........................... 75/10 R, 75/74
[51] Int. Cl. .............................................. C22d 7/02
[58] Field of Search.... 13/9, 17, 117; 75/72, 73, 74, 75/10 R, 92

[56] References Cited
UNITED STATES PATENTS
| | | | |
|---|---|---|---|
| 1,317,327 | 9/1919 | Shoeld | 75/10 R |
| 1,499,020 | 6/1924 | Leonarz | 13/17 X |
| 2,769,706 | 11/1956 | Herneryd et al. | 75/72 X |
| 2,784,081 | 3/1957 | Greenawalt | 75/92 X |
| 3,351,462 | 11/1967 | Arentzen et al. | 75/92 X |
| 3,554,515 | 1/1971 | Tonooka et al. | 75/74 X |

Primary Examiner—Hyland Bizot
Assistant Examiner—M. J. Andrews
Attorney, Agent, or Firm—Stevens, Davis, Miller & Mosher

[57] ABSTRACT

A method and apparatus for preventing the dilution of sulphur dioxide containing waste gases in copper concentrate electric smelting furnaces using an electrode of the Söderberg pattern. The waste gases are removed from the furnace chamber and passed to a cleansing station, where solid particles are removed from the gases. The cleansed gas is then divided into two streams, a major stream and a minor stream. The minor stream of gas is passed to an indirect heat exchanger and cooled therein, whereafter the cooled gas is injected back into the furnace in a manner such that it passes around the electrode. Air is prevented from entering the top of the furnace through the electrode lead-in by means of a seal structure.

1 Claim, 1 Drawing Figure

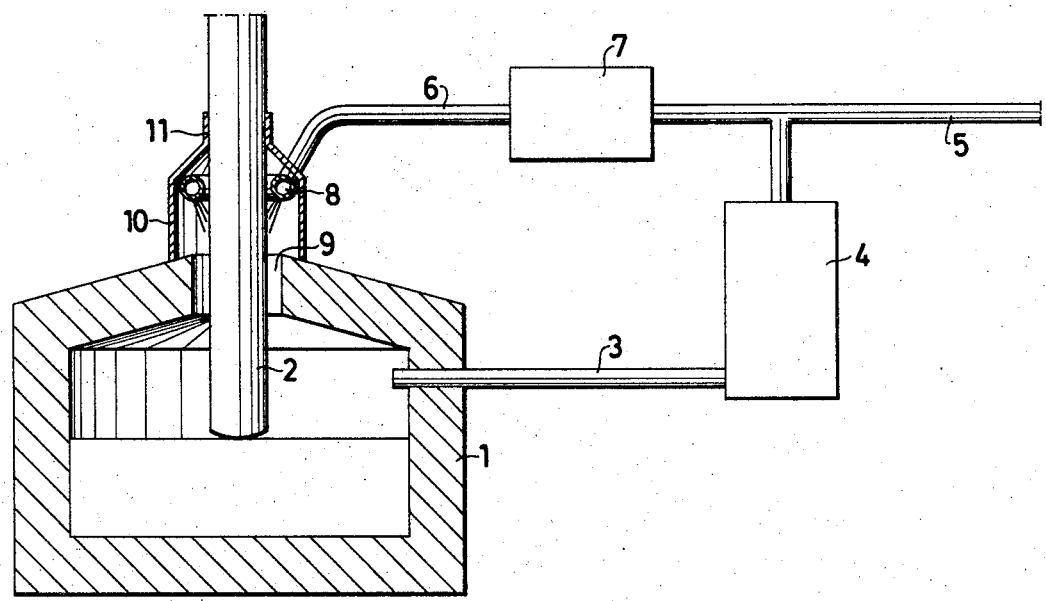

METHOD FOR PREVENTING THE DILUTION OF SULPHUR DIOXIDE CONTAINING WASTE GASES OBTAINED IN COPPER CONCENTRATE ELECTRIC SMELTING FURNACES

The present invention relates to a method and apparatus for preventing the dilution of sulphur dioxide containing waste gases obtained in copper concentrate electric smelting furnaces.

In the manufacture of copper from copper ores, such as copper pyrites and chalcopyrites, the ore is first enriched and then roasted in roasting furnaces, whereinafter the roasted material is smelted to oxidize the same to iron oxide and crude copper. The roasted material is normally smelted in electric furnaces provided with electrodes of the Söderberg pattern, i.e., electrodes which as they are consumed so they are lowered into the molten bath, the electrode being passed through a lead-in opening located in the roof of the furnace. Located between the inner wall of the electrode lead-in opening and the outer surface of the electrode is a space which is used for cooling purposes, ambient air being drawn in around the electrode to cool the same and also the portion of the furnace in the vicinity of the lead-in opening in a manner hereinafter described.

During smelting of the copper material, a gas is formed which contains, in the form of sulphur dioxide, a part of the sulphur present in the copper starting material, i.e., the ore. The formed sulphur dioxide is drawn from the furnace and recovered for further use. In order to prevent the escape of sulphur dioxide containing waste gases from the furnace, for example through the aforementioned space located between the electrode and the inner wall of the lead-in opening — with subsequent environmental problems and sulphur losses — it is necessary to apply a subpressure in the furnace chamber when drawing the sulphur dioxide therefrom. In addition to preventing leakage of sulphur dioxide containing gas from the furnace chamber, the subpressure created therein also creates a down draught, causing large quantities of air to be drawn into the top of the furnace, down past the electrode and into the furnace chamber, where it mixes with the gas. The air drawn into the furnace in this manner is, as previously indicated, used to prevent excessive temperatures in the vicinity of the opening through which the electrode is introduced into the furnace, i.e., the electrode lead-in, and to cool the electrode itself.

The introduction of large quantities of air into the furnace chamber is highly undesirable, however, since it mixes with the gas to dilute the same. Consequently, in practice it is extremely difficult to obtain more than about 2 percent by volume of sulphur dioxide in the waste gases when smelting copper concentrate in furnaces using Söderberg type electrodes, which means that the gases must first be enriched with respect to their sulphur dioxide content, before they can be used in the manufacture of sulphuric acid, for example.

The main object of the present invention is therefore to provide a method and apparatus by means of which the aforementioned problems are eliminated and with which the sulphur dioxide content of the waste gases in the furnace chamber are at least slightly enriched while preventing excessive heating of the electrode and of the furnace in the vicinity of the electrode lead-in.

In accordance with the invention, the removed sulphur dioxide containing waste gases are cleansed to remove entrained solid particles from the gases, whereafter a portion of the thus cleansed gas is cooled and injected into the furnace in a manner such that it passes around the cylindrical surface of the electrode to cool the same, while air is prevented from entering the furnace through the electrode lead-in thereof. In this way, the electrode and the portion of the furnace in the vicinity of the electrode lead-in are held at suitable temperatures, while the cooled $SO_2$ gas reintroduced into the furnace chamber tends to increase at least slightly the content of $SO_2$ of the waste gases successively withdrawn from the furnace. Since cooling of the electrode is effected in the absence of air, the gas is no longer diluted in the manner obtained with present day systems, but is in fact slightly enriched with the $SO_2$ contained in the cooling gas introduced into the furnace.

The invention will now be described with reference to the accompanying drawing, the single FIGURE of which illustrates diagrammatically an apparatus for carrying out the method of the invention.

The illustrative apparatus comprises an electric furnace 1 intended for smelting copper matte and provided with an electrode 2 of the Söderberg pattern. Communicating with the side wall of the furnace 1 is one end of an outlet conduit 3 for waste gases formed during smelting of the matte. The other end of the waste gas conduit 3 communicates with a gas cleansing and pumping means 4. The means 4 may comprise any form of known means for separating solid particles from the sulphur containing waste gases fed thereto and also incorporates pump means for withdrawing the gases from the furnace chamber and passing the cleansed gas through the system.

Connected to the gas cleansing and pumping means 4 is a conduit 5, one end of which communicates with a gas processing or utilizing system, (not shown), e.g., a plant for manufacturing sulphuric acid, while the other end is connected to the inlet side of a gas cooling means 7. Extending from the outlet side of the gas cooling means 7 is a further conduit 6, one end of which communicates with nozzles or the like 8 disposed in the periphery of a housing 10 and arranged in a manner to project the cooled gas against the surface of the electrode. Located between the outer surface of the electrode 2 and the inner wall of the lead-in opening therefor arranged in the roof 12 of the furnace 1 is a gap 9 through which the gases are drawn down into the furnace chamber, while cooling the electrode 2, as a result of the subpressure created therein by the gas pumping means. Air is prevented from entering the furnace through the electrode lead-in by means of a seal structure 11 located on top of the housing 10 and arranged in sealing and sliding contact with the upper portion of the electrode, so as to permit movement of the electrode through the seal.

The gas cooling means may be of any known type with which no dilution of the gas cooled therein takes place.

Although the means for cleansing the gas and passing it through the system has been described with reference to the combined unit 4, it will be readily perceived that the gas cleansing means and the gas pumping means may occupy separate positions in the system.

What is claimed is:

1. In a method for smelting copper ore in an electric furnace using an electrode of the Söderberg pattern, the improvement in combination therewith comprising removing sulphur dioxide containing waste gas with entrained solid particles is removed from the furnace, cleansing the gas by removing solid particles therefrom and cooling a portion of said gas and returning same into the furnace around the electrode, thereby preventing air from entering the furance through the electrode lead-in opening, and preventing the dilution of said gas as would otherwise occur as a result of said air.

* * * * *